US011550298B2

(12) United States Patent
Mayer et al.

(10) Patent No.: US 11,550,298 B2
(45) Date of Patent: Jan. 10, 2023

(54) METHOD FOR OPERATING AN AUTOMATION TECHNOLOGY FACILITY

(71) Applicant: Endress+Hauser Process Solutions AG, Reinach (CH)

(72) Inventors: Michael Mayer, Oberwil (CH); Michael Maneval, Schopfheim (DE); Karl Büttner, Neuenburg (DE); Dirk Hamann, Ludwigshafen (DE)

(73) Assignee: Endress+Hauser Process Solutions AG, Reinach (CH)

( * ) Notice: Subject to any disclaimer, the term of this patent is extended or adjusted under 35 U.S.C. 154(b) by 354 days.

(21) Appl. No.: 16/754,066

(22) PCT Filed: Sep. 17, 2018

(86) PCT No.: PCT/EP2018/075043
§ 371 (c)(1),
(2) Date: Apr. 6, 2020

(87) PCT Pub. No.: WO2019/068451
PCT Pub. Date: Apr. 11, 2019

(65) Prior Publication Data
US 2020/0326686 A1    Oct. 15, 2020

(30) Foreign Application Priority Data
Oct. 6, 2017 (DE) .................... 10 2017 123 222.2

(51) Int. Cl.
*G05B 19/4155* (2006.01)
*H04L 12/40* (2006.01)
(Continued)

(52) U.S. Cl.
CPC .... *G05B 19/4155* (2013.01); *H04L 12/40189* (2013.01); *G05B 2219/31368* (2013.01);
(Continued)

(58) Field of Classification Search
CPC ...... G05B 19/4155; G05B 2219/31368; H04L 12/40189; H04L 2012/40221;
(Continued)

(56) References Cited

U.S. PATENT DOCUMENTS

| 6,047,222 A | 4/2000 | Burns et al. |
| 8,437,368 B2 * | 5/2013 | Krishnamurthi .. H04W 36/0022 370/466 |

(Continued)

FOREIGN PATENT DOCUMENTS

| DE | 102010040055 A1 | 3/2012 |
| DE | 102011010///87 A1 | 12/2012 |

(Continued)

*Primary Examiner* — Jenee Holland
(74) *Attorney, Agent, or Firm* — Kelly J. Smith; Endress+Hauser (USA) Holding, Inc.

(57) ABSTRACT

The present disclosure relates to automation technology. A first gateway is connected via a first communication network to a field device—and a second gateway is connected to the field device via a second communication network. The first and the second gateway are connected to a control unit. The first communication network and the second communication network are connected to a control room. The control room switches over to the other communication network and establishes a communication connection therewith if a problem is detected in the previous communication connection. Communication access to the first gateway is implemented in the control unit, and communication access to the second gateway is implemented in the control unit via a second driver. The control unit continuously analyses the first communication network and the second communication network and in the event of a control room switchover, switches over to the gateway of that network.

7 Claims, 2 Drawing Sheets

(51) Int. Cl.
   *H04L 45/00* (2022.01)
   *H04L 45/28* (2022.01)
   *G05B 9/03* (2006.01)

(52) U.S. Cl.
   CPC ............... *H04L 2012/4026* (2013.01); *H04L 2012/40221* (2013.01)

(58) Field of Classification Search
   CPC ............ H04L 2012/4026; H04L 12/40; H04L 12/40169; H04L 12/40176
   See application file for complete search history.

(56) References Cited

U.S. PATENT DOCUMENTS

| | | | | |
|---|---|---|---|---|
| 9,264,299 | B1* | 2/2016 | Palmer | H04M 7/122 |
| 9,271,255 | B1* | 2/2016 | Jones | H04W 76/15 |
| 2004/0024891 | A1 | 2/2004 | Agrusa et al. | |
| 2005/0028024 | A1 | 2/2005 | Kataoka et al. | |
| 2005/0097165 | A1* | 5/2005 | Lahtinen | G05B 19/4186 709/227 |
| 2009/0307522 | A1* | 12/2009 | Olson | G06F 11/2007 714/E11.178 |
| 2012/0254377 | A1* | 10/2012 | Bernhard | H04L 12/4625 709/220 |
| 2013/0229976 | A1* | 9/2013 | Srinivasan | H04W 88/06 370/315 |
| 2015/0347683 | A1* | 12/2015 | Ansari | G16H 10/60 726/7 |
| 2016/0029281 | A1* | 1/2016 | Zhou | H04W 36/26 370/329 |
| 2016/0357778 | A1* | 12/2016 | MacKenzie | G06F 13/36 |
| 2016/0366239 | A1* | 12/2016 | Rabeela | H04L 67/564 |
| 2017/0078380 | A1* | 3/2017 | Aggarwal | H04L 67/02 |
| 2017/0251445 | A1* | 8/2017 | Du | H04W 56/0025 |

FOREIGN PATENT DOCUMENTS

| | | |
|---|---|---|
| DE | 102015119643 A1 | 5/2016 |
| WO | 2007137880 A1 | 12/2007 |

\* cited by examiner

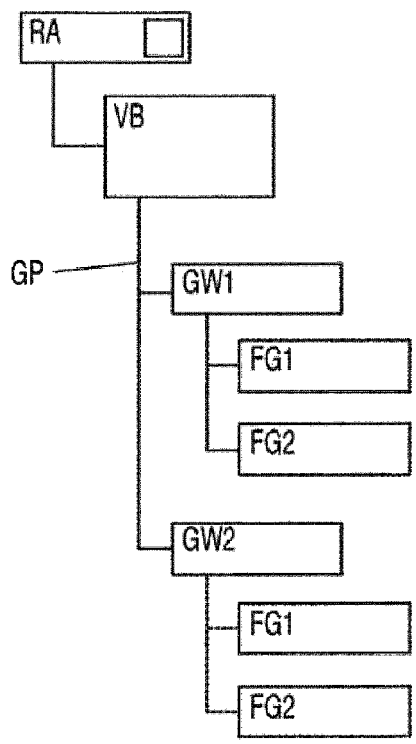
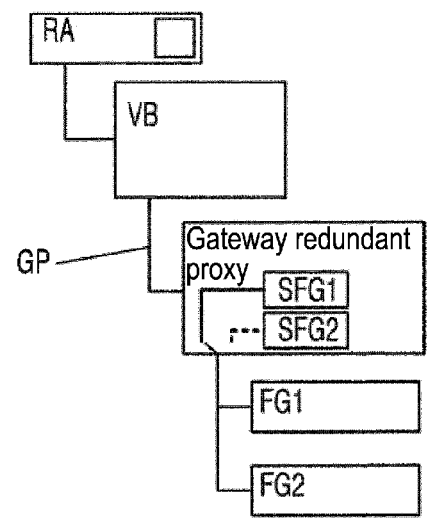
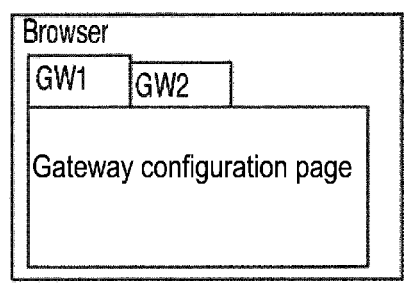
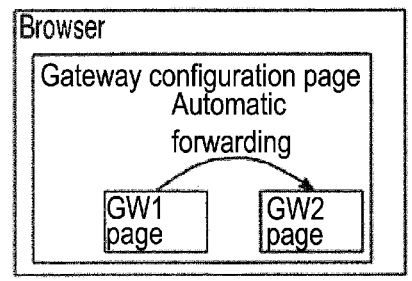
Fig. 2a     Fig. 2b

METHOD FOR OPERATING AN AUTOMATION TECHNOLOGY FACILITY

CROSS-REFERENCE TO RELATED APPLICATIONS

The present application is related to and claims the priority benefit of German Patent Application No. 10 2017 123 222.2, filed on Oct. 6, 2017 and International Patent Application No. PCT/EP2018/075043 filed on Sep. 17, 2018, the entire contents of which are incorporated herein by reference.

TECHNICAL FIELD

The invention relates to a method for operating an automation technology facility in which at least one field device is used.

BACKGROUND

Field devices that are used in industrial facilities are already known from the prior art. Field devices are often used in automation technology, as well as in manufacturing automation. Field devices, in general, refer to all devices which are process-oriented and which supply or process process-relevant information. Field devices are thus used for detecting and/or influencing process variables. Sensor systems serve to detect process variables. For example, these are used for pressure and temperature measurement, conductivity measurement, flow measurement, pH measurement, fill level measurement etc., and detect the corresponding process variables of pressure, temperature, conductivity, pH value, fill level, flow etc. Actuator systems are used to influence process variables. These are, for example, pumps or valves that can influence the flow of a fluid in a pipe or the fill-level in a tank. In addition to the aforementioned measuring devices and actuators, field devices are also understood to include remote I/O's, radio adapters, or, generally, devices that are arranged at the field level.

A variety of such field devices is produced and marketed by the Endress+Hauser group.

In modern industrial facilities, field devices are usually connected to higher-level units via communication networks such as fieldbuses (Profibus®, Foundation® Fieldbus, HART® etc.), for example. Higher-level units are control units, such as an SPS (storage programmable controller) or a PLC (programmable logic controller). The superordinate units are used for process control as well as for commissioning the field devices, among other things. The measured values detected by the field devices, especially, by sensors, are transmitted via the respective bus system to a (or possibly several) superordinate unit(s) that further process the measured values, as appropriate, and relay them to the control station of the installation. The control station serves for process visualization, process monitoring, and process control via the superordinate units. In addition, data transmission from the higher-level unit via the bus system to the field devices is also required, in particular for configuration and parameterization of field devices and for controlling actuators.

What are known as plant asset management systems often access the communication network of the facility in parallel with the facility control. Applications can be implemented on the plant asset management system. For example, these applications allow an overview of the status of the field devices or a configuration capability of the field devices. Such a plant asset management system is typically implemented in an operating unit, for example in a PC, in a laptop, in a mobile operating device, for example a mobile terminal, etc.

To increase security, the communication networks are often designed redundantly. Such a network typically consists of two branches: the main branch and the redundant auxiliary branch. In the event of a fault, the control room switches from the main branch to the redundant auxiliary branch so that reliable communication with the field devices is ensured even in the event of a failure of the main branch.

Such a switching from the main branch to the auxiliary branch is not detected by the asset management system accessing the communication network in parallel with the facility control, which leads to connection termination. In the event that the control room switches to a different communication network, no telegrams are transmitted between the control room and the field device on the previous communication network, whereby the plant asset management system no longer receives any information.

Starting from this problem, the invention is based on the object of providing a method which allows reliable access from an operating unit to a field device via a redundantly designed communication network.

SUMMARY

The object is achieved by a method for operating an automation technology facility, in which facility at least one field device is used,
wherein a first and a second gateway are provided which respectively have a first communication interface and a second communication interface,
wherein the first gateway is connected to the field device via a first communication network by means of the first communication interface,
wherein the second gateway is connected to the field device by means of the first communication interface via a second communication network, connected redundantly and in parallel to the first communication network,
wherein the first and the second gateway are each connected by means of the respective second communication interface to an operating unit for monitoring and/or operating the field device,
wherein the first communication network and the second communication network are connected to a control room of the facility,
wherein the control room establishes a communications connection and communicates either with the first communication network or with the second communication network,
wherein the control room switches over to the corresponding other communication network and establishes a communication connection therewith if a problem is detected in the previous communication connection,
wherein communication access to the first gateway is realized in the operating unit via a first driver in said operating unit,
wherein communication access to the second gateway is realized in the operating unit via a second driver in said operating unit, and
wherein the operating unit continuously analyses the first communication network and the second communication network and, in the event of a control room switchover, switches over to the gateway of that network which actively has a communication connection with the control room.

The advantage of the method according to the invention is that access from the operating unit to a field device is always ensured. The operating unit is designed to always switch over automatically to that communication network via which telegrams are currently transmitted between the control room and the field device. In the event that an exemplary malfunction of the first communication network—which has caused the switching over of the control room to the second communication network—is remedied, and the control room switches back to the first communication network, this re-switching is also registered by the operating unit and a switching back to the gateway of the first communication network takes place.

In the preamble of the specification, a main branch and an auxiliary branch of a communication network in a process automation facility are described. In the sense of the present invention, the first communication network denotes the main branch; the second communication network denotes the auxiliary branch.

Field devices that are mentioned in conjunction with the method according to the invention have already been described by way of example in the preamble of the specification.

According to a first variant of the method according to the invention, it is provided that a frame application, in particular according to the FDT standard, which is configured for communication of the operating unit with the gateways is executed on the operating unit.

According to a first variant of the method according to the invention, it is provided that the operating unit is an OPC server.

In addition to these two mentioned variants, additional variants are also conceivable in which the operating unit is based on a frame application/device driver architecture, for example FDI hosts.

According to a preferred embodiment of the method according to the invention, it is provided that the switching of the operating unit takes place in such a way that the driver of that gateway which is connected to the network, which is actively in communication with the control room, is actively connected, whereas the respective other driver is passively connected. Both gateways and both associated communication networks are hereby visualized to the operator in the interface of the frame application. If a driver of a gateway is passively connected, the visualization of the associated gateway and of the communication network connected to the gateway is also deactivated—for example, the visualization is grayed out, so that operation of the field device via this communication network is not possible for the operator.

According to an advantageous development of the method according to the invention, it is provided that a common driver, in particular a CommDTM or a GatewayDTM, is implemented at the operating unit, by means of which the communication access from the operating unit to the gateways is realized. Instead of the previous two device drivers, only one common device driver is now used for both gateways. Now, two gateways—together with the associated communication network—are not displayed to the user, but rather only the currently active communication network.

According to a preferred embodiment of the method according to the invention, it is provided that the switching of the operating unit takes place in such a way that, in the driver, an access is automatically shifted to the respective gateway which is connected to the network which has an active communication connection with the control room. After switching over, the currently actively switched gateway is automatically displayed in the visualization.

According to an advantageous embodiment of the method according to the invention, the gateways are operated in a listener mode for detecting the switching over of the control room, in which listener mode the gateways also listen to telegrams transmitted via the respective communication network, wherein no telegrams are received via the respective inactive communication network over a predefined time period in the event of a switching over of the control room. The respective affected gateway reports this state to the operating unit, which then checks whether telegrams can be heard by the other gateway. In this instance, the gateway by means of which telegrams could be successfully heard is switched to.

According to a preferred embodiment of the method according to the invention, it is provided that a request is sent at regular time intervals from the gateways to the control room for the detection of the switching, and wherein, in the event of a connection failure, no response of the control room is received via the respective inactive communication network. In the event that a communication network is actively connected, the control room sends a response to the request via this communication network. The gateway then informs the operating unit immediately about the result of the request, thus whether a response to a request was received via a respective gateway. Alternatively, a polling of the gateway can also be initiated by the operator via the operating unit.

BRIEF DESCRIPTION OF THE DRAWINGS

The invention is explained in greater detail with reference to the following figures. The following is shown:

FIG. 2 shows a presentation form of the communication networks in an FDT frame application.

DETAILED DESCRIPTION

Figure 1:
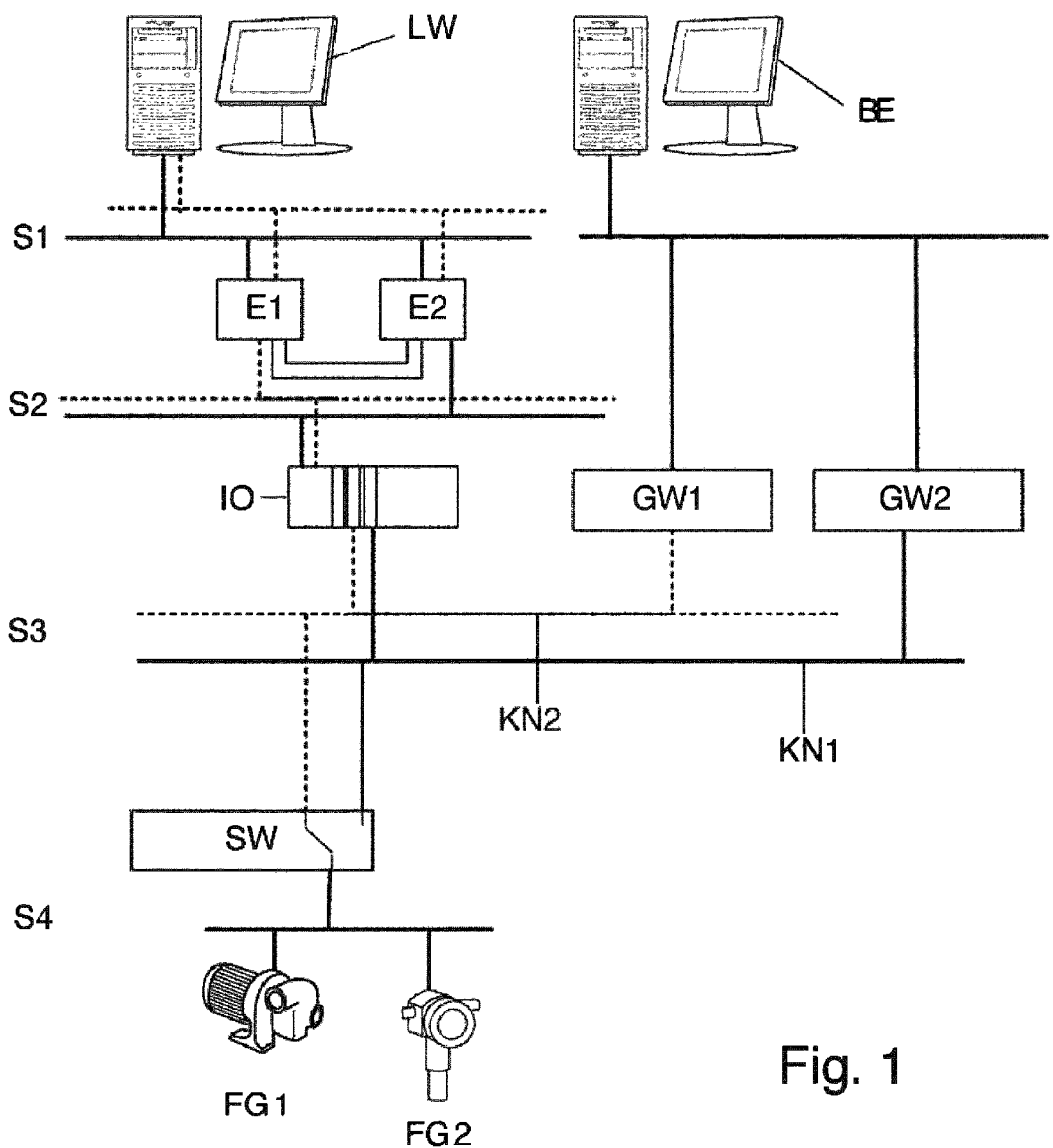
FIG. 1 shows an exemplary embodiment of the method according to the present disclosure.

FIG. 1 shows an exemplary embodiment of the method according to the invention. A process automation facility is hereby depicted. Two field devices FG1, FG2 are used in the facility. These serve to determine a process parameter, for example a fill level, a flow rate, a process pressure etc.

The field devices are connected to one another and to a workstation PC of the control room via a first communication network KN1. The first communication network consists of a plurality of subsegments. In segment S1, the workstation PC is connected to a higher-level control unit E1, for example an SPS. Segment S1 of first communication network KN1 is, for example, an Ethernet network or an industrial fieldbus, for example Profibus DP.

In segment S2 of the first communication network KN1, the higher level control unit E1 is connected to a remote I/O IO. The type of the first communication network KN1 that is present in the segment S2 is in turn an Ethernet network or an industrial fieldbus.

The remote I/O is connected to the field devices FG1, FG2 by means of the third segment S3 and fourth segment S4 of the first communication network. The type of the first communication network KN1 that is present in the segment S2 is typically a fieldbus or a 4-20 mA current loop.

In order to always ensure error-free communication between the workstation PC of the control room LW and the field devices FG1, FG2, the first communication network KN1 is designed to be at least partially redundant. In the segments S1, S2, and S3, a second communication network KN2 is provided which is connected in parallel to the first communication network KN1. It is hereby provided to provide a separate control unit E2 which is arranged between the first segment S1 and the second segment S2 of the second communication network.

Normally, the first communication network KN1 is used for the communication between the workstation PC of the control room LW and the field devices FG1, FG2 while the second communication network KN2 is deactivated. If, however, the control room detects a communication error, that is, it receives no telegrams of the field devices FG1, FG2 via the first communication network KN1, for example, said control room switches over to communication via the second communication network KN2. For this purpose, a switch is provided which is located between segment S3 and segment S4. This connects the common communication network in segment S4 to the communication networks KN1, KN2 located in segments S1 to S3. Alternatively, it may be provided that the switch element is located directly in the workstation PC of the control room LW, and that the first communication network KN1 is designed to be completely redundant, so that the second communication network KN2 is also located in the section S4.

Furthermore, an operating unit BE is provided in the facility. A plant asset management system is provided therein for configuring and/or monitoring the field devices FG1, FG2. The operating unit BE is connected to the first communication network by means of a first gateway GW1. In order to also be able to communicate with the field devices FG1, FG2 when the control room has switched over to the second communication network KN2, the operating unit BE is additionally connected to the second communication network KN2 by means of a second gateway GW2. In order to use the correct communication network KN1, KN2, the gateways GW1, GW2 detect the network traffic on the two communication networks KN1, KN2 and give feedback to the operating unit as to whether telegrams can be heard on these communication networks. In the event that the control room LW switches over to the second communication network KN2, telegrams can no longer be heard via the first communication network KN1. This is communicated to the operating unit, which likewise performs a switch-over via reconfiguration.

There are two possibilities available for this purpose, which are explained with the aid of FIG. 2: FIG. 2 shows a presentation form of the communication networks in an FDT frame application RA. The FDT frame application RA is implemented in operating unit BE and is used to control field devices FG1, FG2, as well as to display information from field devices FG1, FG2 and about the field devices FG1, FG2. For this purpose, drivers must be provided on the operating unit BE both for the field devices FG1, FG2 and for the gateways GW1, GW2, which drivers are loaded into the frame application. The drivers ensure that commands to the respective components FG1, FG2, GW1, GW2 are correctly encoded, or that commands received from the components FG1, FG2, GW1, GW2 are correctly interpreted.

The first variant, depicted in FIG. 2a, is that a separate device driver is provided for each of the gateways GW1, GW2. FIG. 2a shows above a device path GP which is displayed to an operator at the operating unit BE via the frame application. The frame application RA contains a management module VB which detects the switching between the communication networks KN1, KN2 by the control room and performs a reconfiguration of the operating unit BE.

Located one level below this management module VB are the individual gateways GW1, GW2, for both of which a common device driver is provided. Located one level below the gateways are the field devices FG1, FG2 connected to the respective gateway GW1, GW2.

By selecting one of the two gateways GW1, GW2, a device-specific page ("gateway configuration page"), depicted at the bottom in FIG. 2a, opens in the browser of the operating unit BE, which page offers setting possibilities or operating possibilities for the respective gateway GW1, GW2. Each gateway GW1, GW2 here has its own page, as is visible from the tabs depicted in FIG. 2a below. By selecting one of the field devices FG1, FG2 from the management tree, a device-specific page may also be opened for the latter in the browser, via which information about the field device FG1, FG2 may be displayed and the field device may also be operated under the circumstances. Since, in the normal operating state, communication between the control room and the field devices FG1, FG2 takes place only via the first communication network, the driver of the first gateway is activated while the driver of the second gateway is deactivated. The field devices which are located in the device path below the second device path are therefore grayed out and cannot be selected by an operator.

In this first variant, it is provided that the operating unit BE performs a reconfiguration via the detection of the switching over of the control room, as reported by the gateways GW1, GW2, to a communication via the second communication network KN2. In this instance, the device driver of the first gateway GW1 is deactivated while the device driver of the second gateway is deactivated. Accordingly, in the device path the field devices FG1, FG2 below the first gateway GW1 are grayed out and cannot be selected, whereas these are now available in the device path below the second gateway GW2.

It can be seen as disadvantageous in this first variant that two separate device drivers are required. Two instances of the field devices FG1, FG2 are thus visualized in the device path GP.

The first variant, depicted in FIG. 2b, consists of implementing a common driver at the operating unit, in particular a CommDTM or a GatewayDTM, for the gateways GW1, GW2, by means of which the communication access from the operating unit BE to the gateways GW1, GW2 is realized. In the device path GP, shown above in FIG. 2b, instead of both gateways GW1, GW2 a common instance ("gateway redundant proxy") is now visualized, under which is respectively still located only one instance of the field devices FG1, FG2. In the normal operating state, it is provided that the driver is configured such that the first gateway GW1 is accessed. In the detection of a switchover by the control room to the second communication network KN2, the common driver is reconfigured in such a way that this is configured for communication with the second gateway. The device path does not hereby change. Moreover, there exists only one device-specific page for the gateways GW1, GW2, shown below in FIG. 2b, which automatically refers to the gateway GW1, GW2 which is connected to the currently active communication network KN1, KN2.

By means of the method according to the invention, it is always ensured that the operating unit BE can access the field devices FG1, FG2 or contains information of the field devices FG1, FG2, even if the control room switches over the communication with the field devices FG1, FG2 to a different communication network KN1, KN2 due to a communication error.

In addition to the use of an FDT frame application on the operating unit BE, other systems can of course also be used, for example, but not so as to be limiting, OPC servers or FDI hosts within the scope of the method according to the invention.

The invention claimed is:

1. A method for operating an automation technology facility in which at least one field device is used, the method including:
   providing a first and a second gateway including a first communication interface, respectively;
   connecting the first gateway via a first communication network to the field device using the first communication interface;
   connecting the second gateway via a second communication network to the field device using the second communication interface, wherein the first communication network and the second communication network are operating in parallel;
   connecting the first and the second gateway to an operating unit;
   connecting the first communication network and the second communication network to a control room of the automation technology facility;
   establishing a communication connection by the control room for communication with the first communication network or the second communication network; and
   switching over to a previous communication network by the control room and establishing a communication connection therewith if a problem is detected in a previous communication connection;
   wherein communication access to the first gateway is realized in a control unit via a first driver in the control unit;
   wherein communication access to the second gateway is realized in the control unit via a second driver in the control unit;
   wherein the control unit continuously analyses the first communication network and the second communication network and, in the event of a control room switchover, switches over to the gateway of that network which actively has a communication connection with the control room; and
   wherein the gateways are operated in a listener mode for detecting the switching over of the control room, in which listener mode a plurality of gateways listen to telegrams transmitted via the respective communication network, wherein no telegrams are received via the respective inactive communication network over a predefined time period in the event of a switching over of the control room.

2. The method of claim 1, wherein a frame application runs on the operating unit for communication of the operating unit with the gateway.

3. The method of claim 1, wherein the operating unit is an OPC server.

4. The method of claim 1, wherein the switching over of the operating unit takes place such that the driver of that gateway which is connected to the communication network is actively connected.

5. The method of claim 1, wherein a common driver is implemented at the operating unit for communication access from the operating unit to a plurality of gateways.

6. The method of claim 5, wherein the switching over of the operating unit takes place such that, in the driver, an access is automatically shifted to a respective gateway which is connected to the network which has an active communication connection with the control room.

7. The method of claim 1, wherein a request is sent at regular time intervals from the gateways to the control room for the detection of the switchover, and wherein, in the event of a connection failure, no response of the control room is received via the respective inactive communication network.

* * * * *